(No Model.)
W. STANLY, Jr. & W. B. TOBEY.
ELECTRICAL CONDENSER.
No. 498,907. Patented June 6, 1893.
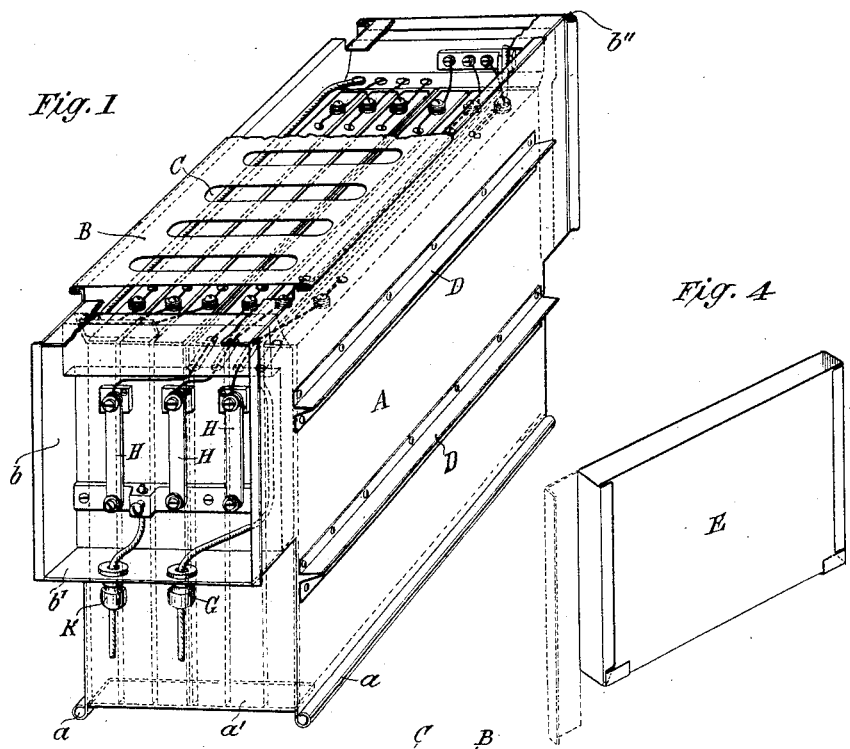
Fig. 1
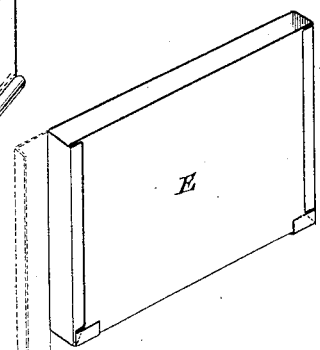
Fig. 4
Fig. 2
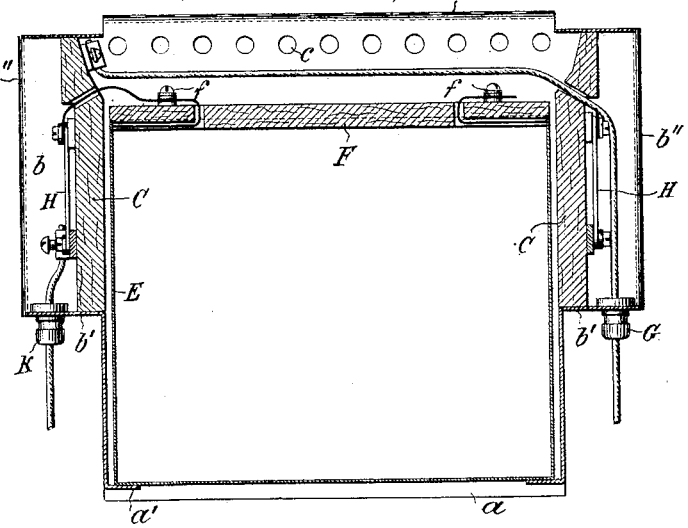
Fig. 3
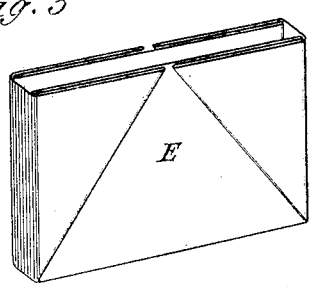
Witnesses:
Raphaël Netter
James Cutlow
Inventors
William Stanly Jr.
and William B. Tobey
by Duncan & Page,
Attorneys.

UNITED STATES PATENT OFFICE.

WILLIAM STANLY, JR., AND WILLIAM B. TOBEY, OF PITTSFIELD, MASSACHUSETTS, ASSIGNORS TO THE STANLEY LABORATORY COMPANY, OF SAME PLACE.

ELECTRICAL CONDENSER.

SPECIFICATION forming part of Letters Patent No. 498,907, dated June 6, 1893.

Application filed January 9, 1892. Serial No. 457,719. (No model.)

*To all whom it may concern:*

Be it known that we, WILLIAM STANLY, Jr., and WILLIAM B. TOBEY, citizens of the United States, residing at Pittsfield, in the county of Berkshire and State of Massachusetts, have invented certain new and useful Improvements in Electrical Condensers, of which the following is a specification, reference being had to the drawings accompanying and forming a part of the same.

In the said drawings Figure 1 is a view in perspective of our improved device in its entirety. Fig. 2 is a vertical section of the same. Figs. 3 and 4 are perspective views on a reduced scale of condenser boxes or cases of improved construction.

A represents an outer box or case made preferably of sheet iron from a single piece punched out of a large sheet. The lower side edges $a$ are rolled to impart strength and rigidity and the edges of the ends $a'$ are turned in to form ledges or shelves. The upper side edges are turned over to form flanges for receiving a cover B, the side edges of which are turned downward and inward to engage with the flanges. At one or generally at both ends of the box are formed the wings $b$ which with the outwardly extending wing $b'$ from the ends form fuse boxes or chambers. The upright side edges of these latter are flanged to receive sliding covers $b''$ similar to that for the top, and one or both of the said wings $b$ forms the top of the fuse chambers, or a separate piece may be used for this purpose if desired. The fuse chambers (or chamber) are divided off from the main box by wooden or other insulating partitions C. To further strengthen the box one or more stiffening ribs of sheet metal D are secured to the sides of the same, and to secure ventilations perforations $c$ are made in the sides and top or cover of the same.

E is a condenser case which to distinguish it from the main box above described we designate an individual condenser box. We prefer to make these boxes of sheet iron by cutting out suitable blanks and bending them up into shape, as shown, either in Figs. 3 or 4, and soldering the joints when required so as to make them water-tight. A given number of condenser plates or sheets, properly insulated and bound up, are placed in each of these boxes and the boxes are then closed by wooden plates or bars F provided with terminals $f, f$, to which the plates of the condenser within the box are suitably connected. The outer boxes are made to contain a given number of the individual condenser cases or boxes, and to leave an air space around each, as indicated in Fig. 1.

When the individual condenser cases are placed in the main box one terminal of each condenser is connected to a main terminal, as G, while the other is connected through a safety strip or fusible wire H with the other terminal K.

For convenience, when any considerable number of individual condensers is used, we use two fuse boxes, as shown in the drawings, carrying one-half the terminals through fuses in one box and the remainder through similar fuses in the other.

The special construction and arrangement of fuses and connections are largely immaterial, and being matters now well understood require no detailed description or explanation.

From the above-described construction of the device or apparatus which embodies our improvements the nature of the said improvements will now more fully appear. We secure a sectional condenser, each division or section of which is separately incased and sealed in tight cases provided with fixed terminals. Moreover, we insure against injury to the sections by connecting each one to the circuit or to common terminals through an individual fuse, and thus very greatly enlarge the practical value and usefulness of the condenser as a whole. In addition to these more important features, we have improved the mechanical construction of the device in the particulars above indicated, and provided for the thorough ventilation of the sections by using casings of heat-conducting material and forming air passages between the same.

What we now claim is—

1. A condenser composed of sections separately incased in boxes of heat-conducting material, contained in a main box or casing with air spaces between, the main box being provided with openings for securing ventilation.

2. A condenser composed of separately incased sections connected through individual fuses with common terminals, as set forth.

3. A condenser composed of separately incased sections each provided with terminals and all contained in a main box or casing having terminals to which the sections are connected through individual fuses.

4. A condenser composed of sections incased in sheet-metal boxes, and provided with terminals.

5. A condenser composed of sections incased in sheet-metal boxes fitted into a sheet-metal case or box and having ventilating passages between the said boxes.

6. The condenser case consisting of a sheet-metal box with fuse boxes or compartments at its ends, in combination with a series of condenser sections separately incased in sheet-metal boxes, fixed terminals on the main and sectional boxes, and individual fuses connecting the terminals of the sections with the common terminals of the main or containing box.

WILLIAM STANLY, Jr.
WILLIAM B. TOBEY.

Witnesses:
JOHN F. KELLY,
ERNEST B. CASTLE.